(12) United States Patent
Khatri

(10) Patent No.: US 7,251,460 B2
(45) Date of Patent: Jul. 31, 2007

(54) RADIO COMMUNICATION SYSTEM

(75) Inventor: Bhavin S. Khatri, London (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 419 days.

(21) Appl. No.: 10/156,441

(22) Filed: May 28, 2002

(65) Prior Publication Data

US 2003/0013468 A1    Jan. 16, 2003

(30) Foreign Application Priority Data

Jun. 29, 2001    (GB) ................................. 0115937.5

(51) Int. Cl.
*H03C 7/02* (2006.01)
*H04M 1/00* (2006.01)
*H04L 1/02* (2006.01)

(52) U.S. Cl. ..................... 455/101; 455/562.1; 375/267

(58) Field of Classification Search .................. 455/39, 455/501, 101, 103, 562.1, 102, 63.1, 524; 375/265, 267, 240, 299; 370/525, 337, 340
See application file for complete search history.

(56) References Cited

U.S. PATENT DOCUMENTS

| | | | | |
|---|---|---|---|---|
| 5,297,169 | A * | 3/1994 | Backstrom et al. | 455/422.1 |
| 6,067,290 | A * | 5/2000 | Paulraj et al. | 370/329 |
| 6,370,129 | B1 * | 4/2002 | Huang | 370/329 |
| 6,763,073 | B2 * | 7/2004 | Foschini et al. | 375/260 |
| 6,775,329 | B2 * | 8/2004 | Alamouti et al. | 375/267 |
| 6,785,558 | B1 * | 8/2004 | Stratford et al. | 455/561 |
| 6,891,897 | B1 * | 5/2005 | Bevan et al. | 375/265 |
| 2003/0026238 | A1 * | 2/2003 | Baills et al. | 370/347 |

FOREIGN PATENT DOCUMENTS

| | | |
|---|---|---|
| EP | 0905920 A2 | 3/1999 |
| EP | 0929161 A2 | 7/1999 |
| EP | 1047218 A2 | 10/2000 |

\* cited by examiner

*Primary Examiner*—Tilahun Gesesse

(57) ABSTRACT

A radio communication system comprises a communication channel between a transmitter (106) comprising a plurality of antennas (108) and a receiver (112) comprising at least one antenna. The communication channel is wideband and comprises a plurality of paths, and the transmitter comprises means for splitting data for transmission into a plurality of sub-streams. The receiver comprises fewer antennas than the number of transmitted sub-streams and sampling means for determining at least as many substantially uncorrelated received signal samples as the number of sub-streams.

In one embodiment, transmissions on the channel employ code division techniques and the sampling means comprises a Rake receiver. In another embodiment a maximum likelihood technique is used to generate sufficient samples. By means of the present invention a receiver for use in a Multiple Input Multiple Output (MIMO) communication system may comprise fewer antennas than the number of sub-streams, thereby enabling smaller terminals.

19 Claims, 2 Drawing Sheets

RADIO COMMUNICATION SYSTEM

The present invention relates to a radio communication system having a communication channel comprising a plurality of paths between first and second terminals. The present invention also relates to a terminal for use in such a system and to a method of operating such a system.

In a radio communication system, radio signals typically travel from a transmitter to a receiver via a plurality of paths, each involving reflections from one or more scatterers. Received signals from the paths may interfere constructively or destructively at the receiver (resulting in position-dependent fading). Further, differing lengths of the paths, and hence the time taken for a signal to travel from the transmitter to the receiver, may cause inter-symbol interference.

It is well known that the above problems caused by multipath propagation can be mitigated by the use of multiple antennas at the receiver (receive diversity), which enables some or all of the multiple paths to be resolved. For effective diversity it is necessary that signals received by individual antennas have a low cross-correlation. Typically this is ensured by separating the antennas by a substantial fraction of a wavelength, although closely-spaced antennas may also be employed by using techniques disclosed in our co-pending International patent application WO 01/71843 (applicant's reference PHGB000033). By ensuring use of substantially uncorrelated signals, the probability that destructive interference will occur at more than one of the antennas at any given time is minimised.

Similar improvements may also be achieved by the use of multiple antennas at the transmitter (transmit diversity). Diversity techniques may be generalised to the use of multiple antennas at both transmitter and receiver, known as a Multi-Input Multi-Output (MIMO) system, which can further increase system gain over a one-sided diversity arrangement. As a further development, the presence of multiple antennas enables spatial multiplexing, whereby a data stream for transmission is split into a plurality of sub-streams, each of which is sent via many different paths. One example of such a system is described in U.S. Pat. No. 6,067,290, another example, known as the BLAST system, is described in the paper "V-BLAST: an architecture for realising very high data rates over the rich-scattering wireless channel" by P W Wolniansky et al in the published papers of the 1998 URSI International Symposium on Signals, Systems and Electronics, Pisa, Italy, Sep. 29 to Oct. 2, 1998.

In BLAST each sub-stream is sent to a single antenna. In alternative systems each sub-stream can be mapped to a different spatial direction using antenna beam-forming techniques. An example of a MIMO system with dynamically changing beam directions is disclosed in our co-pending unpublished International patent application PCT/IB02/00029 (Applicant's reference PHGB010012).

Typically in a MIMO system the original data stream is split into N sub-streams, each of which is transmitted by a different antenna of an array having $n_T = N$ elements. A similar array having $n_R \geq N$ elements is used to receive signals, each antenna of the array receiving a different superposition of the N sub-streams. Using these differences, together with knowledge of the channel transfer matrix H, the sub-streams can be separated and recombined to yield the original data stream. In a variation of such a system, disclosed in published European Patent Application EP-A2-0,905,920, the sub-streams are transformed before transmission such that, after propagation through the channel, another transformation recovers the original sub-streams. However, such a system requires knowledge of the transfer matrix H at both transmitter and receiver, since the transformations applied are based on a singular value decomposition of that matrix.

The performance gains which may be achieved from a MIMO system may be used to increase the total data rate at a given error rate, or to reduce the error rate for a given data rate, or some combination of the two. A MIMO system can also be controlled to reduce the total transmitted energy or power for a given data rate and error rate. In theory, the capacity of the communications channel increases linearly with the smaller of the number of antennas on the transmitter or the receiver. However, a more useful way to view a MIMO system is that the capacity of the channel is limited by the number of statistically independent paths between the transmitter and receiver, caused by scatterers in the environment.

In addition, as discussed above, known MIMO systems rely on placing the antennas sufficiently far apart to achieve substantially uncorrelated signals.

A major problem with known MIMO techniques, when applied to a mobile radio communication system, is the requirement for multiple antennas to be placed on physically small mobile terminals and with sufficient spacing that the signal envelopes are uncorrelated at each antenna. In addition, for each antenna a separate RF front-end is needed. Future third generation cellular systems, such as UMTS (Universal Mobile Telecommunication System) will operate at a frequencies in the region of 2 GHz. At such frequencies and in a well-scattered environment, an antenna spacing of $\lambda/2$ (approximately 7 to 8 cm) is desired. In addition, in environments where the multipath is not well scattered (when the angular spread of multipath arrivals is small) larger antenna spacing are required to achieve good decorrelation between antennas.

An object of the present invention is to address the above problem.

According to a first aspect of the present invention there is provided a radio communication system having a communication channel comprising a plurality of paths between a primary and a secondary station, wherein the communication channel is wideband, wherein the primary station comprises a plurality of antennas and transmitting means having means for separating a signal for transmission into a plurality of sub-streams and for transmitting each sub-stream via one or more of the plurality of antennas, the number of sub-streams being no more than the number of antennas, and wherein the secondary station comprises at least one antenna, receiving means for receiving signals comprising the plurality of sub-streams transmitted by the primary station, the number of antennas being fewer than the number of sub-streams, sampling means for determining at least as many substantially uncorrelated received signal samples as the number of sub-streams and extraction means for extracting the transmitted sub-streams from the signal samples.

The present invention makes use of the recognition that, in a wideband channel, a plurality of substantially uncorrelated signal samples may be determined from each received signal. If the system uses code division multiple access techniques, the channel only has to be wideband with respect to the chip period of the spreading code and the signal samples may be obtained by a Rake receiver. In other cases the channel is typically required to be wideband with respect to a symbol period, and a maximum likelihood estimation technique may be used to determine the transmitted sub-streams.

According to a second aspect of the present invention there is provided a secondary station for use in a radio communication system having a communication channel comprising a plurality of paths between a primary and the secondary station, wherein the communication channel is wideband, and wherein the secondary station comprises at least one antenna, receiving means for receiving signals comprising a plurality of sub-streams transmitted by the primary station, the number of antennas being fewer than the number of sub-streams, sampling means for determining at least as many substantially uncorrelated received signal samples as the number of sub-streams and extraction means for extracting the transmitted sub-streams from the signal samples.

According to a third aspect of the present invention there is provided a method of operating a radio communication system having a communication channel comprising a plurality of paths between a primary and a secondary station, wherein the communication channel is wideband, wherein the primary station comprises a plurality of antennas and the secondary station comprises at least one antenna, the method comprising the primary station separating a signal for transmission into a plurality of sub-streams and transmitting each sub-stream via one or more of the plurality of antennas, the number of sub-streams being no more than the number of primary station antennas and the number of secondary station antennas being fewer than the number of sub-streams, and the secondary station receiving signals comprising the plurality of sub-streams transmitted by the primary station, determining at least as many substantially uncorrelated received signal samples as the number of sub-streams and extracting the transmitted sub-streams from the signal samples.

The present invention is based upon the recognition, not present in the prior art, that a MIMO receiver can have fewer antennas than the number of transmitted sub-streams if there is sufficient delay spread to obtain independent time samples of the received signals.

Embodiments of the present invention will now be described, by way of example, with reference to the accompanying drawings, wherein.

In the drawings the same reference numerals have been used to indicate corresponding features.

Figure 1:
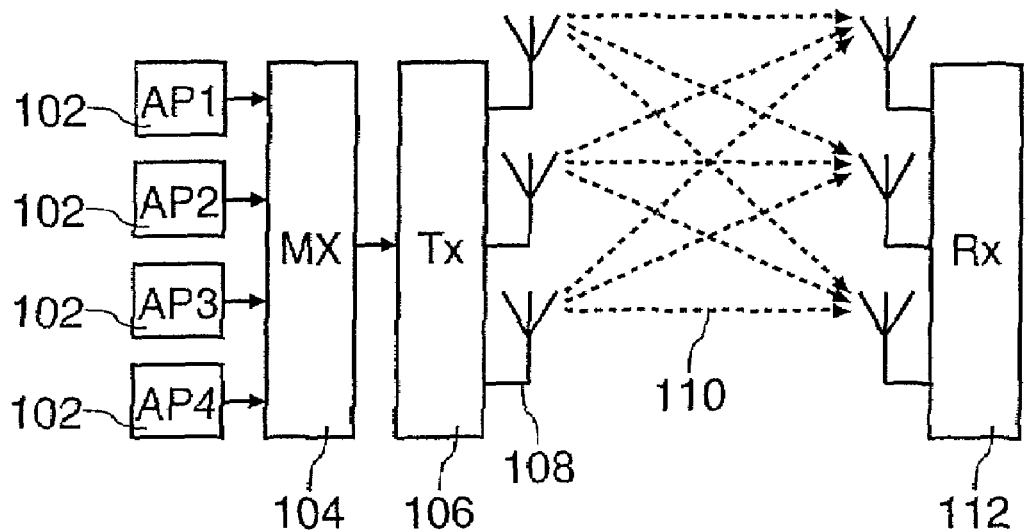
FIG. 1 is a block schematic diagram of a known MIMO radio system.

FIG. 1 illustrates a known MIMO radio system. A plurality of applications 102 (AP1 to AP4) generate data streams for transmission. An application 102 could also generate a plurality of data streams. The data streams are combined by a multiplexer (MX) 104 into a single data stream, which is supplied to a transmitter (Tx) 106. The transmitter 106 separates the data stream into sub-streams and maps each sub-stream to one or more of a plurality of transmit antennas 108.

Suitable coding, typically including Forward Error Correction (FEC), may be applied by the transmitter 106 before multiplexing. This is known as vertical coding, and has the advantage that coding is applied across all sub-streams. However, problems may arise in extracting the sub-streams since joint decoding is needed and it is difficult to extract each sub-stream individually. As an alternative each sub-stream may be coded separately, a technique known as horizontal coding which may simplify receiver operation.

These techniques are discussed for example in the paper "Effects of Iterative Detection and Decoding on the Performance of BLAST" by X Li et al in the Proceedings of the IEEE Globecom 2000 Conference, San Francisco, Nov. 27 to Dec. 1, 2000.

If vertical coding is used the FEC which is applied must have sufficient error-correcting ability to cope with the entire MIMO channel, which comprises a plurality of paths 110. For simplicity of illustration only direct paths 110 between antennas 108 are illustrated, but it will be appreciated that the set of paths will typically include indirect paths where signals are reflected by one or more scatterers.

A receiver (Rx) 112, also provided with a plurality of antennas 108, receives signals from the multiple paths which it then combines, decodes and demultiplexes to provide respective data streams to each application. Although both the transmitter 110 and receiver 112 are shown as having the same number of antennas, this is not necessary in practice and the numbers of antennas can be optimised depending on space and capacity constraints. Similarly, the transmitter 106 may support any number of applications (for example, a single application on a voice-only mobile telephone or a large number of applications on a PDA).

The central principle behind any 'parallel' type communication system is to find multiple ways with which to communicate, that can in some way be distinguished at the receiver. For example in OFDM systems, in effect, different sub-streams are sent at different carrier frequencies, the spacing of which are such that they are orthogonal and can be distinguished at the receiver. Similarly in the BLAST system, in a well scattered environment, by having the transmit antennas spaced a minimum distance of $\lambda/2$ from each other, the signal received by a single antenna consists of a linear sum of each sub-stream, the phase and amplitude of each sub-stream being independent. However, the sub-streams cannot be distinguished from the single antenna without more information—the problem is like solving a simultaneous equation with N unknowns (the sub-streams), for which at least N unrelated or independent equations are needed to distinguish the N unknowns unambiguously. In the BLAST system, this is achieved by having $n_R (\geq N)$ antennas, each spaced apart from the others by a minimum distance of $\lambda/2$. This minimum spacing ensures that the $n_R$ signals from each receiver antenna provide $n_R$ independent linear combinations of the N unknown sub-streams—the $n_R$ combinations being the required simultaneous equations. The coefficients for the equations are the complex channel transfer coefficients between the $n_T$ transmitter antennas and the $n_R$ receiver antennas, described by a transfer matrix H (discussed below).

The above explanation has implicitly assumed that the propagation channel is 'narrowband', i.e. the delay spread is small compared to the signalling bit or symbol period. What this means in practice is that as far as a single antenna receiver is concerned the multipath signals appear as a single signal within a symbol period, even though this signal is actually composed of many multipath waves arriving at different angles and times. The receiver 112 effectively integrates everything within the symbol period. Another way of looking at this is that the receiver 112 doesn't have the bandwidth to resolve (in time) the individual multipath components.

However, there are also scenarios in which the delay spread of the channel is greater than the symbol period, in which case the channel is 'wideband'. The receiver 112 will then be able to resolve some multipath signals, the extent to which this is possible depending on the ratio of delay spread to symbol period. In such cases inter-symbol interference reduces the maximum data rate through the channel.

The present invention is applicable to such wideband scenarios. If the multipath signals can be resolved into $J(\geq n_T)$ time bins to give J signals $r(1), r(2), \ldots, r(j), \ldots, r(J)$, these can then be used as the independent equations to unambiguously solve for the $n_T$ sub-streams. The validity of this approach is based on the assumption that each time bin consists of a different sum of the transmitted sub-streams, and that there is no correlation between the times of arrival and angles of arrival of multipath signals. By using a number of time bins, the required number of antennas 108 on the receiver 112 can be reduced, so that the requirement that allows extraction of the sub-streams is now $Jn_R \geq n_T$ (since each antenna 108 can provide J independent time samples).

In embodiments of the present invention, the maximum number of time bins J is the greatest integer of (delay spread)/(symbol period). This may, however, not be the optimum value of J. When there is little signal energy in the last time bin, for example when the delay spread is only slightly larger than J−1 times the symbol period, the effectiveness of the last time bin is negligible and the effective maximum number of time bins is J−1.

A major advantage of the present invention is a reduction of the number of antennas 108, and consequently the number of RF front-ends needed in the receiver 112. In addition, it provides a convenient way to utilise inter-symbol interference in wideband channels to help increase the capacity of the channel. It should be noticed that this capacity increase only occurs for downlink signals (unless the mobile station has more antennas than the base station, in which case it only occurs for uplink signals). However, in many communication systems there is significantly more downlink traffic than uplink traffic, so this limitation is not a major disadvantage. The requirement for a wideband channel can also be met in a CDMA (Code Division Multiple Access) system when the chip period is significantly less than the delay spread, which is generally the case.

Two embodiments of the present invention are considered in respect of a non-CDMA system, both of which make use of known mobile communications processing techniques. The first embodiment is a modification of the BLAST system, referred to above, in which processing of multiple signals from antennas 108 is replaced (at least in part) by processing of J independent time samples. The second embodiment is a generalisation of Maximum Likelihood Sequence Estimation (MLSE), as described for example in Chapter 16 of "Antennas and Propagation for Wireless Communication Systems" by S R Saunders, published by John Wiley and Sons in 1999.

Common to both embodiments is a requirement to measure the channel matrix H. In the context of the present invention an element of H, $h_{ji}$, is the complex transfer coefficient between the $j^{th}$ sample period at the receiver 112 and the $i^{th}$ transmitter antenna 108. This measurement can be performed using a known sequence of training bits in the pre-amble of a burst of data. Once H has been determined at the beginning of a burst, the measurement will remain valid for the duration of the burst provided that the channel does not change significantly in this time. Since the underlying basis of both embodiments is well known, the discussion below focuses on issues arising in their application to the present invention.

The first embodiment is based on a BLAST system. Once J time samples have been received, the task is to extract the separate sub-streams that were transmitted in the $n^{th}$ symbol period, using conventional nulling and subtraction of unwanted and already extracted sub-streams. However, when trying to extract sub-streams there are two sources of inter-symbol interference, that from 'previous' bits in the $(n-1)^{th}$ symbol period and from 'next' bits in the $(n+1)^{th}$ symbol period.

Figure 2:
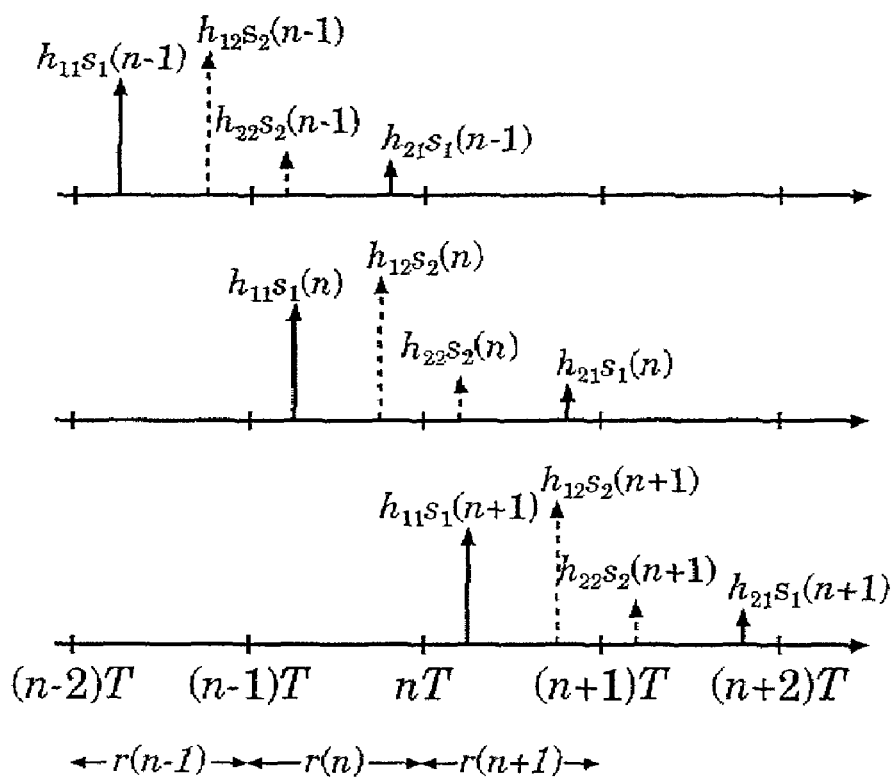
FIG. 2 shows arriving multipath signals from a transmitter having two antennas.

This problem is explained with reference to FIG. 2, which shows arriving multipath signals from a transmitter 106 having two antennas 108 ($n_T$=2). Signals from the first antenna 108 are indicated by a solid line and those from the second antenna 108 by a dashed line, the height of the line indicating the received signal strength. In this example the symbol period is T and the delay spread extends over two symbol periods. The top row of signals relate to sub-streams transmitted in the $(n-1)^{th}$ symbol period, the middle row to sub-streams transmitted in the $n^{th}$ symbol period, and the bottom row to sub-streams transmitted in the $(n+1)^{th}$ symbol period. $s_2(n)$ corresponds to the transmitted sub-stream from the second antenna in the $n^{th}$ symbol period, and $r(n)$ corresponds to the received signal in the $n^{th}$ symbol period.

Consider the received signals $r(n)$ and $r(n+1)$, comprising the two time bins from which it is hoped to extract the sub-streams $s_1(n)$ and $s_2(n)$. Interference from sub-streams transmitted during the previous symbol period, $s_1(n-1)$ and $s_2(n-1)$, can in principle be cancelled, since once the sub-streams have been extracted, they can be passed through a filter that represents the channel (effectively multiplied by H) to determine what signals would be received by the receiver 112. These signals can then be subtracted from the two time samples relating to the $n^{th}$ symbol period, thereby cancelling their effect. This is simply a form of decision feedback, as used in equalisation techniques.

However, removal of the effect of sub-streams transmitted during the next symbol period, $s_1(n+1)$ and $s_2(n+1)$, is not straightforward as they cannot simply be cancelled as they have yet to be extracted. In principle the effect of these sub-streams can be removed in the process of extracting the bits from the $(n+1)^{th}$ period. However, to do this requires as many equations as there are independent variables.

Referring again to FIG. 2, when the effect of the sub-streams transmitted in the $(n-1)^{th}$ symbol period is removed from the signal received in the $n^{th}$ symbol period $r(n)$, there are only contributions from sub-streams transmitted in the $n^{th}$ symbol period. However, to determine $s_1(n)$ and $s_2(n)$ requires two independent equations, the second of which must come from the next received signal $r(n+1)$. Unfortunately, as can be seen from FIG. 2, this signal includes contributions from two further unknowns, namely the sub-streams transmitted in the next symbol period, $s_1(n+1)$ and $s_2(n+1)$. The situation is therefore that there are now two equations in four unknowns. Further measurements do not improve matters any further. Hence, this approach results in an irreducible lower limit on the achievable error rate due to the inter-symbol interference.

The second embodiment aims to overcome the problems with the first embodiment by using a maximum likelihood approach. The basic idea of such an approach is that on receiving a series of signals, for example $r(1), r(2), \ldots, r(j), \ldots, r(J)$, a determination is made of which sequence of bits sent from $n_T$ transmission antennas is most likely to have given rise to the received signals, once propagated through the channel having channel matrix H.

In principle, given very large computing power and resources, a direct application of this method would be to receive a large burst of data, containing say L symbol periods (each symbol period containing information for multiple sub-streams), and then to perform a joint maximum likelihood decision on the whole burst. Mathematically, if the L samples are treated as a vector r (i.e. r=[r(1), r(2), ... ,r(j), ... ,r(J)]$^T$) the aim is to calculate the conditional probability p(r|S,H), where S is a matrix of $n_T$ sub-streams transmitted over L symbol periods, for all possible sequences S can take. The particular sequence S that gives the highest probability is selected as the most likely transmitted sequence. However, consider a modest scenario in which $n_T$=2 and L=100. Since S is a $n_T \times L$ matrix, with the assumption that binary modulation is used for each sub-stream, the number of distinct values S can take is $2^{200}$ (approximately $10^{60}$). Hence, such an approach is unlikely to be feasible.

A far more efficient implementation of this embodiment is to use a modified version of the Viterbi algorithm, described in the book by Saunders referred to above. It is possible to re-express the calculation of the sequence of maximum probability as one of maximising the correlation between the received sequence r and u(S,H). This latter term is the sequence which would have been received (in the absence of noise) if a sequence of sub-streams S was sent via a channel matrix H. The correlation, up to the $l^{th}$ symbol period of these sequences, is given the term metric and is expressed as $$J_l(S) = \int_0^{lT} \Re\{r(t)u^*(t,S)\}dt \quad (1)$$

where $\Re\{z\}$ indicates the real part of z. This expression can be decomposed into a correlation over the last symbol period and all previous symbol periods of the burst, i.e.

$$J_l(S) = \int_0^{(l-1)T} \Re\{r(t)u^*(t,S)\}dt + \int_{(l-1)T}^{lT} \Re\{r(t)u^*(t,S)\}dt \quad (2)$$
$$= J_{l-1}(S) + Z_l(S)$$

The incremental metric Z(S) over one symbol period is far easier to calculate, since there are far fewer permutations of S to consider. The number of different values the incremental metric can take depends on the delay spread of the channel and the number of transmit antennas 108. For example, if $n_T$=2 and the delay spread extends over two symbol periods (so that only the previous bit interferes in a given symbol period), there are in total $2^4$ possibilities, since there are 4 bits contributing to each symbol period (1 bit for each antenna over two symbol periods delay spread). This can be generalised to an M-ary modulation scheme, with $n_T$ transmit antennas and a delay spread extending over J symbol periods, to give $M^{n_T J}$ possibilities for Z(S). Hence, the complexity can still increase very quickly with increasing delay spread and number of transmit antennas 108.

The principle of the Viterbi algorithm is to store the metrics for the most likely routes that end with all the possible values of the bits that interfere in the $l^{th}$ symbol period. In total there will be $M^{n_T(J-1)}$ possibilities for these interfering bits, since the current symbol period is not included. From each of these possibilities, or states, there will be $M^{n_T}$ incremental metrics that describe the evolution from the $(l-1)^{th}$ to $l^{th}$ symbol periods. The metric which is the greatest or most likely will be selected. Hence, there is one metric determined for each of the states for the bits that will interfere in the next symbol period. This process is repeated until the last symbol period of the transmission burst is reached, when it is possible to make a decision as to the most likely transmitted sequence of bits S, by choosing the final metric which is largest.

Figure 3:
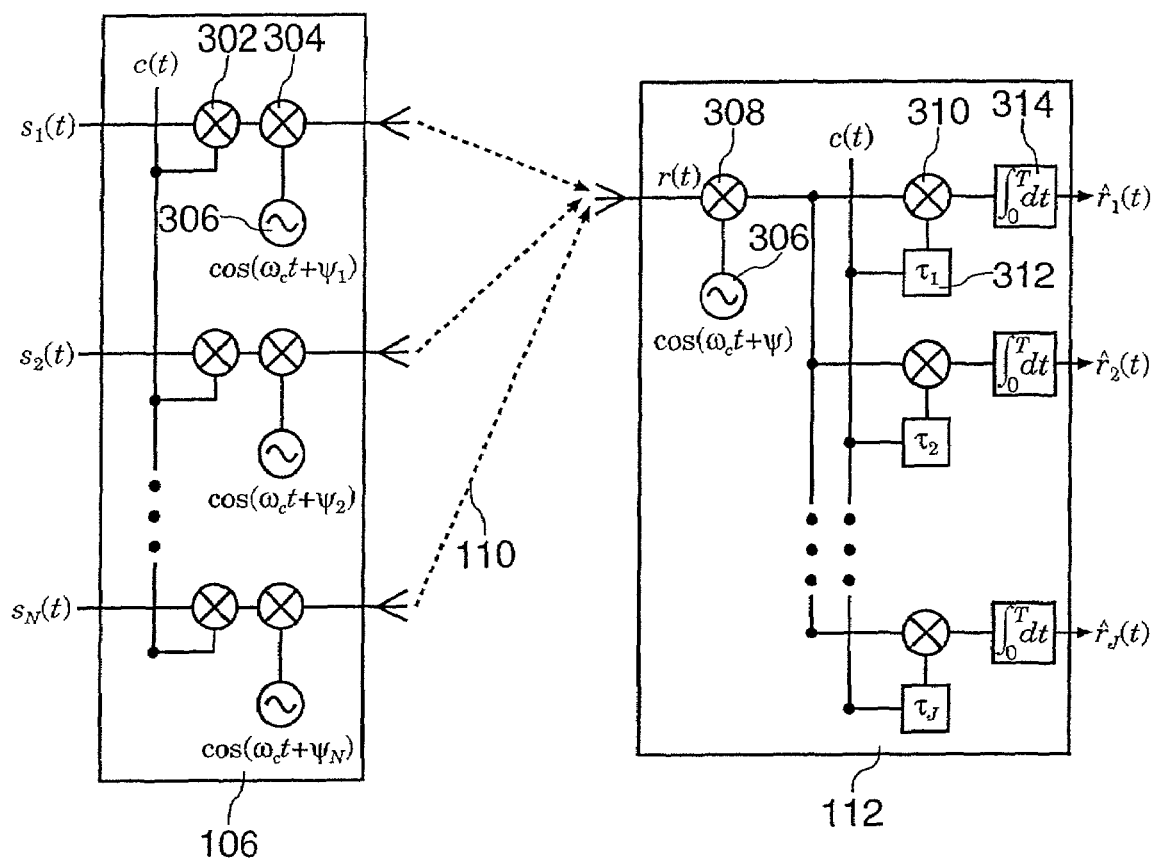
FIG. 3 is a block schematic diagram of a MIMO system comprising a CDMA transmitter and a Rake receiver.

Now consider a third embodiment of the present invention, shown in FIG. 3, relating to a MIMO system having a CDMA transmitter and a Rake receiver. The transmitter 106 takes as its input N sub-streams $s_1(t)$ to $s_N(t)$. Each sub-stream is mixed with a spreading code c(t) by a respective mixer 302, then mixed by a further mixer 304 with a radio frequency signal supplied by a signal source 306. The signal sources 306 all have the same angular frequency $\omega_c$ and optionally have different respective phase shifts $\psi_1$ to $\psi_N$. In the illustrated embodiment each radio frequency signal is supplied for simplicity to a respective antenna 108 although, as indicated above, beam-forming techniques may be used to direct different sub-streams in different spatial directions.

The radio signals propagate via a plurality of paths 110 to a Rake receiver 112, having a single antenna 108. The operating principles of such a receiver are well known, and so will only be summarised here. The received signal r(t), comprising a summation of all combinations of sub-streams and paths, is mixed down to a baseband by a mixer 308, fed by a signal source 306. The down-converted signal is then fed to a plurality of Rake fingers, each of which comprises a mixer 310 for mixing the signal with the spreading code c(t) fed through a delay block 312 and integrating the resultant signal over the symbol period T. By selecting appropriate delays, $\tau_1$ to $\tau_N$, for each finger individual multipath signals can be extracted, which signals are output from the receiver 112 as $\hat{r}_1(t)$ to $\hat{r}_J(t)$.

The ability of a Rake receiver to discriminate multipath components depends on the channel being wideband with respect to the chip period $T_c$ of the spreading sequence. The receiver 112 shown in FIG. 3 is able to distinguish J multipath components provided they are of sufficient strength and separated by delays greater $T_c$. Each extracted multipath component is an uncorrelated linear sum of the sub-streams sent.

In a receiver made in accordance with the present invention, the uncorrelated samples of the sub-streams $s_1$ to $S_N$ are used to perform MIMO processing. However, the assumption of uncorrelated samples from each finger may not be realistic, due to poor auto-correlation properties of the spreading codes used and in addition the extra noise power introduced by the poor cross-correlation between codes. These factors will now be examined.

Assuming that there are no other users the received signal on the $j^{th}$ finger will have the form $$\hat{r}_j = \sum_{i=1}^{N} h_{ji}s_i + \sum_{i=1}^{N}\sum_{j \neq j'} h_{j'i}s_i R_{cc}(\tau_j - \tau_{j'}) + v_j \quad (3)$$

where $1 \leq \{j,j'\} \leq J$. The first term is the required linear sum of sub-streams, and the term $v_j$ represents Additive White Gaussian Noise (AWGN) caused by thermal effects. The second term is due to imperfect auto-correlation of the spreading code used (PN-sequence or orthogonal code). In other words the auto-correlation function $R_{cc}$ is non-zero for offsets other than zero. $R_{cc}$ is defined as:

$$R_{cc}(\tau_j - \tau_{j'}) = \int_0^{T=MT_c} c(t-\tau_j)c(t-\tau_{j'})dt \quad (4)$$

where M is the number of chip periods $T_c$ in a symbol period T.

The second term in equation 3 can be regarded as auto-correlation noise. The effect of this is to increase the correlation between the fingers of the Rake receiver 112, since it is effectively a form of inter-chip interference. In other words, energy from other time delays or fingers j' leak into the current finger j.

Now consider the effect of a downlink channel serving K receivers 112, each having its own spreading code $c_k(t)$. The output of the $j^{th}$ finger for the $k^{th}$ user is $\hat{r}_{jk}$, given by $$\hat{r}_{jk} = \sum_{i=1}^{N} h_{ji}s_{ik} + \sum_{i=1}^{N}\sum_{j\neq j'} h_{j'i}s_{ik}R_{cc}(\tau_j - \tau_{j'}) + \sum_{i=1}^{N}\sum_{j'=1}^{J}\sum_{k\neq k'} h_{j'i}s_{ik}R_{c_k c_{k'}}(\tau_j - \tau_{j'}) + v_j \quad (5)$$

where $1 \leq \{j,j'\} \leq J$ and $1 \leq \{k,k'\} \leq K$. The third term in equation 5 is an extra noise term, in addition to the AWGN term $v_j$. This extra noise is caused by imperfect cross-correlation between spreading codes.

The cross-correlation function $R_{c_k c_{k'}}$ between the spreading codes for different users is given by:

$$R_{c_k c_{k'}}(\tau_j - \tau_{j'}) = \int_{0}^{T=MT_c} c_k(t - \tau_j)c_{k'}(t - \tau_{j'}) dt \quad (6)$$

Ideally, the auto-correlation and cross-correlation properties of the spreading codes, defined by equations 4 and 6 respectively, should have the following properties:

$R_{cc}(\tau) = \delta(\tau)$ $R_{c_k c_k}(\tau) = 0$

In other words the codes should have an impulse-like auto-correlation to prevent inter-chip interference and zero cross-correlation between codes to prevent interference from transmitted signals intended for other receivers 112. However, in practice the choice of spreading codes is restricted to PN sequences (m-sequences or Gold codes) or orthogonal sequences such as Walsh-Hadamard codes.

PN sequences are known to have good, impulse-like auto-correlation properties, but not such good cross-correlation properties ($R_{c_k c_{k'}}(\tau)$ is relatively low for all values of $\tau$). In contrast, Walsh-Hadamard codes are columns taken from an orthogonal matrix U (i.e. $UU^T = I$). Hence the cross correlation is guaranteed to be zero for zero delay ($\tau=0$), but for all other delays the cross-correlation can be very large. Their auto-correlation properties are also quite poor, with the function $R_{cc}$ usually having energy spread across the whole length of the code in a triangular fashion. Hence, in any environment with delayed multipath components (also corresponding to environments where this MIMO technique will work), the cross-correlation of orthogonal codes will be poor and so together with their poor auto-correlation, PN sequences probably represent the best choice.

Now consider a specific CDMA embodiment, for a UMTS FDD (Frequency Division Duplex) mode downlink. The UMTS chip period $T_c$ is 0.26 µs (3.84 Mchips/s), with respect to which most typical mobile channels will be considered as wideband. In a UMTS system, signals for different users are spread using respective orthogonal Walsh-Hadamard codes (the channelisation codes). The combined set of signals for transmission from one base station is then scrambled (essentially spread) using a particular PN sequence called a Gold code, with a different Gold code selected for each cell or base station.

Consequently, when the received data streams are descrambled using a Rake receiver 112, the outputs of the fingers have very good decorrelation, due to the impulse-like auto-correlation properties of the Gold codes. The architecture of a transmitter 106 and receiver 112 for UMTS FDD is very similar to that shown in FIG. 3. The principal difference is that in the transmitter 106 the spreading code $c(t)$ is replaced by $c_k(t)\sigma(t)$, where $c_k(t)$ is the channelisation code for the $k^{th}$ user and $\sigma(t)$ is the scrambling code for all users in a particular cell, while in the receiver 112 the spreading code $c(t)$ is replaced by $c_k(t)\sigma^*(t)$. Note that the scrambling code $\sigma(t)$ is complex, hence the need for its complex conjugate.

The received baseband signal $r(t)$ is $$r(t) = \sum_{i=1}^{N}\sum_{j'=1}^{J}\sum_{k'=1}^{K} h_{j'i}s_{ik'}c_{k'}(t)\sigma(t) \quad (7)$$

Hence, the output of the $j^{th}$ Rake finger for the $k^{th}$ user can be expressed as $$\hat{r}_{jk} = \int_{0}^{T} \sum_{i=1}^{N}\sum_{j'=1}^{J}\sum_{k'=1}^{K} h_{j'i}s_{ik'}c_{k'}(t-\tau_{j'})\sigma(t-\tau_{j'})\sigma^*(t-\tau_j)c_k(t-\tau_j) dt$$

$$= \sum_{i=1}^{N}\sum_{j'=1}^{J}\sum_{k'=1}^{K} h_{j'i}s_{ik'} \int_{0}^{T} c_{k'}(t-\tau_{j'})\sigma(t-\tau_{j'})\sigma^*(t-\tau_j)c_k(t-\tau_j) dt \quad (8)$$

It can be seen that when j'=j, the scrambling code $\sigma(t-\tau_j)$ is multiplied by its complex conjugate $\sigma^*(t-\tau_j)$, which gives a continuous string of ones over the bit period T. Hence, all the terms for which j'=j can be extracted, to give $$\hat{r}_{jk} = \sum_{i=1}^{N}\sum_{k'=1}^{K} h_{j'i}s_{ik'} \int_{0}^{T} c_{k'}(t-\tau_j)c_k(t-\tau_j) dt + \sum_{i=1}^{N}\sum_{j\neq j'}\sum_{k'=1}^{K} f_{ij'k'}(t-\tau_j)$$

$$= \sum_{i=1}^{N} h_{ji}s_{ik} + \sum_{i=1}^{N}\sum_{k'\neq k} h_{ji}s_{ik'} R_{c_k c_{k'}}(0) + \sum_{i=1}^{N}\sum_{j\neq j'}\sum_{k'=1}^{K} f_{ij'k'}(t-\tau_j)$$

$$= \sum_{i=1}^{N} h_{ji}s_{ik} + \sum_{i=1}^{N}\sum_{j\neq j'}\sum_{k'=1}^{K} f_{ij'k'}(t-\tau_j) \quad (9)$$

where $f_{ij'k'}(t-\tau_j)$ represents all terms for which j'≠j. The fact that $R_{cc}(0)=1$ and $R_{c_k c_k}(0)=0$ for Walsh-Hadamard codes has been used in the derivation of equation 9 above.

The first term is the required linear sum of the separate sub-streams transmitted from each antenna 108. The last term can be decomposed into terms dependent on the wanted signals for the $k^{th}$ user $s_{ik}$, (i.e. auto-correlation noise) and terms that are dependent on the signals from all other users $s_{ik}$ (i.e. cross-correlation noise):

$$\hat{r}_{jk} = \sum_{i=1}^{N} h_{ji} s_{ik} + \sum_{j' \neq j} h_{j'i} s_{ik} \int_0^T c_k(t-\tau_{j'}) c_k(t-\tau_j) \qquad (10)$$

$$\sigma(t-\tau_{j'}) \sigma^*(t-\tau_j) dt + \sum_{k' \neq k} \sum_{j' \neq j} h_{j'i} s_{ik'} \int_0^T$$

$$c_{k'}(t-\tau_{j'}) c_k(t-\tau_j) \sigma(t-\tau_{j'}) \sigma^*(t-\tau_j) dt$$

The auto and cross-correlation noise terms are represented by the second and third terms respectively in equation 10. It can be shown that these terms will tend to have good auto and cross-correlation properties due to the Gold codes used. Put simply, the correlation integrals measure the degree of randomness between sequences and it is known that the Gold codes σ(t) have good randomness properties for the same code with different delays (impulse-like auto-correlation). Therefore, the multiplication σ(t−τ$_{j'}$)×σ*(t−τ$_j$) (for j'≠j) should produce another random sequence, whose randomness is signified by the small value of the auto-correlation function of the scrambling code, $R_{\sigma\sigma}(\tau_j-\tau_{j'})$ (where $R_{\sigma\sigma}(\tau)=\int \sigma(t)\sigma(t-\tau)dt$). Subsequent multiplication by the channelisation codes should keep the sequence essentially random (roughly equal numbers of ±1's), since the channelisation codes are unrelated to the scrambling code. In the worst case the channelisation codes may be 100% correlated and the above integrals will reduce to $R_{\sigma\sigma}(\tau_j-\tau_{j'})$, which is known to be small for j'≠j.

The most important point to note from the above discussion is that the auto-correlation and cross-correlation noise terms will be kept low by the good auto-correlation properties of the scrambling code. This leaves J uncorrelated combinations of the N transmitted sub-streams from the J Rake fingers. This was the original requirement, and enables the use of a range of MIMO techniques such as BLAST and space-time coding.

It should be noted that there is an additional source of interference, not considered above, from the cross-correlation with other base stations in adjacent cells using different Gold codes for scrambling. The magnitude of this interference is likely to be small due to the extra path loss from base stations in adjacent cells (except at cell boundaries) and is of less importance to MIMO techniques, since the cross-correlation will only be perceived as extra noise rather than increased correlation of the Rake fingers.

The present invention can in principle be applied to any wireless communication scenario to give data rates with high spectral efficiency (i.e. high data rates in a relatively small bandwidth) the main requirement for the invention to work effectively is enough independent multipath components separated with angle. However, since the invention has the potential to reduce the requirements on the number of antennas needed on mobile handsets, it is particularly applicable to forthcoming cellular systems such as UMTS, where the use of CDMA techniques is particularly suited to the present invention.

Most of the analysis above has assumed that the transmitter 106 and receiver 112 are quasi-static, in other words that the elements of the channel matrix H change only very slowly. However, the system can cope with a moving transmitter and/or receiver provided that the frame duration is significantly less than the average period over which changes in the channel matrix occur. Hence, the present invention is suitable for mobile cellular communications, as well as fixed point to point indoor wireless links.

Although in the above description independent signal samples were derived from signals received by each antenna, the present invention may be applied to systems in which antenna arrays make use of beamforming techniques to receive signals from particular sets of directions.

The present invention has been described in relation to having a smaller number of antennas 108 than the number of transmitted sub-streams. However, the method of determining a plurality of uncorrelated samples from signals received from each antenna can have wider applicability. In particular, it could be applied to a system having any number of antennas: with more samples than sub-streams the channel matrix H is over-determined which can improve the signal-to-noise ratio for each sub-stream and hence the overall robustness of the system.

The invention claimed is:

1. A radio communication system having a communication channel comprising a plurality of paths between a primary and a secondary station, wherein the communication channel is wideband, wherein the primary station comprises a plurality of antennas that consists of a number of antennas and further comprises transmitting means having means for separating a current signal for transmission into a plurality of sub-streams and for transmitting, for current reception by said secondary station, each of the plurality of sub-streams of said current signal via a respective one or more of the plurality of antennas, said plurality of sub-streams of said current signal consisting of a number of sub-streams that is no more than said number of antennas, and wherein the secondary station comprises at least one antenna, receiving means for currently receiving signals comprising said plurality of sub-streams of said current signal, said at least one antenna collectively constituting a number of antennas that is smaller than said number of sub-streams of said current signal being currently received, sampling means for determining at least as many substantially uncorrelated received signal samples as said number of sub-streams of said current signal and extraction means for extracting the transmitted sub-streams of said current signal from the signal samples.

2. The system as claimed in claim 1, wherein the channel is wideband when its delay spread is significantly longer than a symbol period.

3. The system as claimed in claim 1, wherein transmissions on the channel employ code division techniques and in that the channel is wideband when its delay spread is significantly longer than a chip period.

4. The radio communication system of claim 1, wherein said sampling means is configured for said determining, for said current signal, based on input from a single one of said at least one antenna.

5. The radio communication system of claim 4, wherein said sampling means is configured for determining at least as many substantially uncorrelated received signal samples as said number of antennas that is smaller than said number of sub-streams.

6. The radio communication system of claim 4, wherein the currently received signals are comprised of multipath signals that are resolved into time bins each of which consists of a different sum of the transmitted sub-streams.

7. A secondary station for use in a radio communication system having a communication channel comprising a plurality of paths between a primary and the secondary station, wherein the communication channel is wideband, and wherein the secondary station comprises at least one antenna, receiving means for currently receiving signals comprising a plurality of sub-streams of a current signal transmitted currently by the primary station by means of a respective one or more of a number of antennas, wherein said plurality of sub-streams consists of a number of sub-streams that is no more than said number of antennas, said at least one antenna collectively constituting a number of antennas that is smaller than said number of sub-streams of said current signal being currently received, sampling means for determining at least as many substantially uncorrelated received signal samples as said number of sub-streams of said current signal and extraction means for extracting the transmitted sub-streams of said current signal from the signal samples.

8. The secondary station as claimed in claim 7, wherein transmissions on the channel employ code division techniques and in that the sampling means comprises a Rake receiver.

9. The secondary station as claimed in claim 7, wherein the sampling means comprises means for determining a plurality of substantially uncorrelated time samples of received signals.

10. The secondary station as claimed in claim 9, wherein the sampling means further comprises maximum likelihood sequence estimation means.

11. The secondary station as claimed in claim 10, wherein the maximum likelihood sequence estimation means implements a modified Viterbi algorithm.

12. The secondary station of claim 7, wherein said sampling means is configured for said determining, for said current signal, based on input from a single one of said at least one antenna.

13. The secondary station of claim 12, wherein said sampling means is configured for determining at least as many substantially uncorrelated received signal samples as said number of antennas that is smaller than said number of sub-streams.

14. The secondary station of claim 12, wherein the currently received signals are comprised of multipath signals that are resolved into time bins each of which consists of a different sum of the transmitted sub-streams.

15. A method of operating a radio communication system having a communication channel comprising a plurality of paths between a primary and a secondary station, wherein the communication channel is wideband, wherein the primary station comprises a plurality of antennas that consists of a first number of antennas and the secondary station comprises at least one antenna collectively constituting a second number of antennas, the method comprising the primary station separating a current signal for transmission into a plurality of sub-streams consisting of a number of sub-streams and currently transmitting each of the plural sub-streams via one or more of said plurality of antennas, said number of sub-streams being no more than said first number of antennas, said second number of antennas being smaller than said number of sub-streams, and the secondary station currently receiving signals comprising the plural sub-streams currently transmitted by the primary station, determining at least as many substantially uncorrelated received signal samples as said number of sub-streams of said current signal and extracting the transmitted sub-streams of said current signal from the signal samples.

16. The method of claim 15, wherein said sampling means is configured for said determining, for said current signal, based on input from a single one of said at least one antenna.

17. The method of claim 16, wherein said sampling means is configured for determining at least as many substantially uncorrelated received signal samples as said second number of antennas.

18. The method of claim 16, wherein the currently received signals are comprised of multipath signals that are resolved into time bins each of which consists of a different sum of the transmitted sub-streams.

19. A radio communication system comprising:
   a primary station, wherein the primary station includes a plurality of antennas, a transmitter to separate a signal for transmission into a plurality of sub-streams via respective ones of said plurality of antennas, wherein the number of said plurality of sub-streams is no more than said number of antennas; and
   a secondary station, wherein the secondary station includes at least one antenna, a receiver to receive signals having said plurality of sub-streams, said at least one antenna is smaller than said number of sub-streams, a sampler to determine at least as many substantially uncorrelated received signal samples as said number of sub-streams of said current signal and an extractor to extract the transmitted sub-streams from the signal samples.

* * * * *